Oct. 16, 1956     A. J. DANNA, JR     2,767,039
JUICE CAN STORAGE RECEPTACLE AND DISPENSER

Filed Dec. 16, 1953     2 Sheets-Sheet 1

Inventor:
Anthony J. Danna, Jr.
Paul O. Pippel
Atty.

Oct. 16, 1956　　　A. J. DANNA, JR　　　2,767,039
JUICE CAN STORAGE RECEPTACLE AND DISPENSER
Filed Dec. 16, 1953　　　2 Sheets-Sheet 2
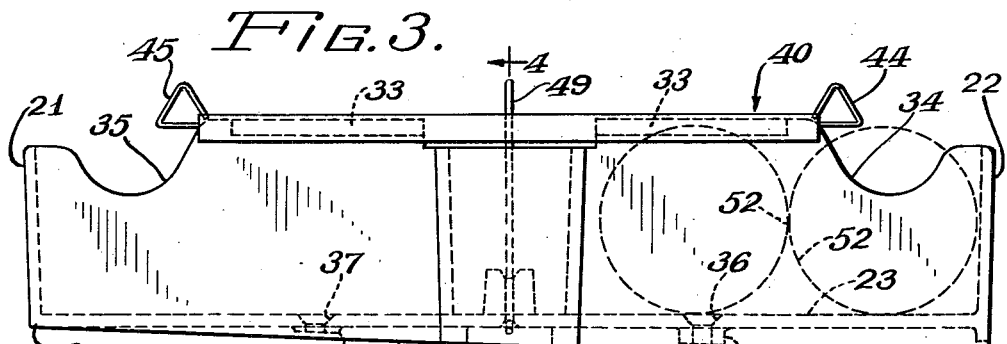
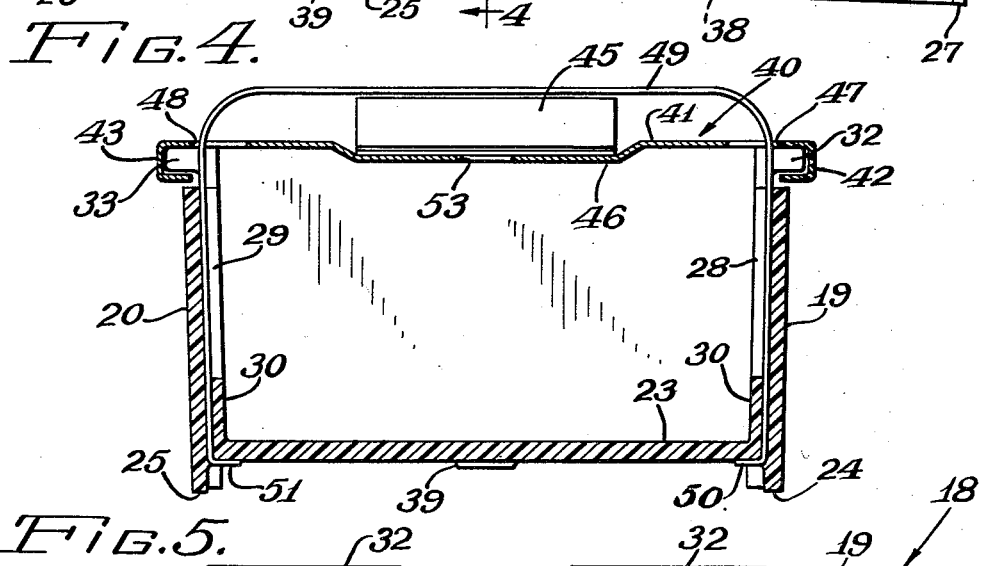
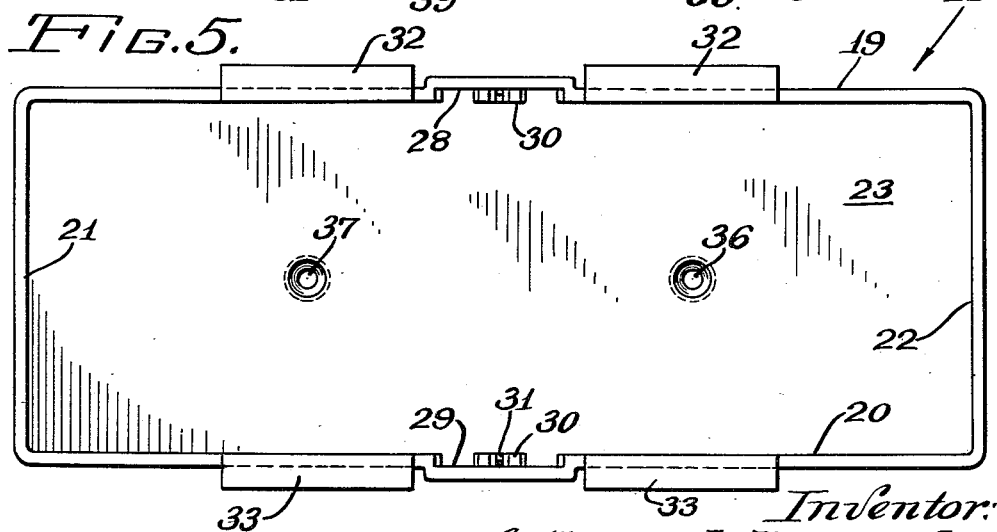
Inventor:
Anthony J. Danna, Jr.

United States Patent Office 2,767,039
Patented Oct. 16, 1956

2,767,039
JUICE CAN STORAGE RECEPTACLE AND DISPENSER

Anthony J. Danna, Jr., Grosse Pointe, Mich., assignor, by mesne assignments, to Whirlpool-Seeger Corporation, a corporation of Delaware Application December 16, 1953, Serial No. 398,460

6 Claims. (Cl. 312—295)

This invention relates to containers and dispensers but more specifically it is directed to a juice can storage receptacle and dispensing device adapted for use in refrigerated cabinets.

The principal object of this invention is to provide an improved and inexpensive combination storage and dispensing receptacle which is suitable for storing and dispensing food articles, such as cans of fruit juice or other like cylindrical objects.

Another object is to provide a storage and dispensing device adapted for removable mounting on an inner wall surface of a refrigerated cabinet.

A further object is to provide a receptacle having means associated therewith to facilitate the insertion or removal of articles from either end thereof.

A still further object is to provide a food can storage receptacle having a cover or top member that is slidable longitudinally thereof to permit the ready insertion or removal of food cans or the like one at a time into or out of said receptacle.

A yet still further object is to provide a container having a cover resiliently retained against slidable movement and being slidable within predetermined limits so that longitudinal displacement thereof will permit ready removal of a portion of the contents of the container.

Another important object is to provide a combination storage and dispensing device adapted for mounting on the underneath side of the door of a top-opening-type refrigerated cabinet and having a slidably secured and resiliently interlocked cover member effectively positioned for retaining articles therewithin when said device is mounted in a vertical or an inverted position.

A further important object is to provide a food storage receptacle with a longitudinally slidable cover thereon and having resilient interlocked constraining means associated with said cover to permit longitudinal displacement of said cover within limits determined by said resilient means so as to facilitate access to the contents of the receptacle from either end thereof.

The foregoing and other objects and advantageous features of the invention will be understood and will become more apparent from the following description when read in conjunction with the drawings, in which:

Figure 3 is a side elevational view of the proposed device;

Figure 4 is a sectional view taken on line 4—4 of Figure 3; and

Figure 5 is a top plan view of the proposed device with the slidable top or cover member thereof removed.

Figure 1:
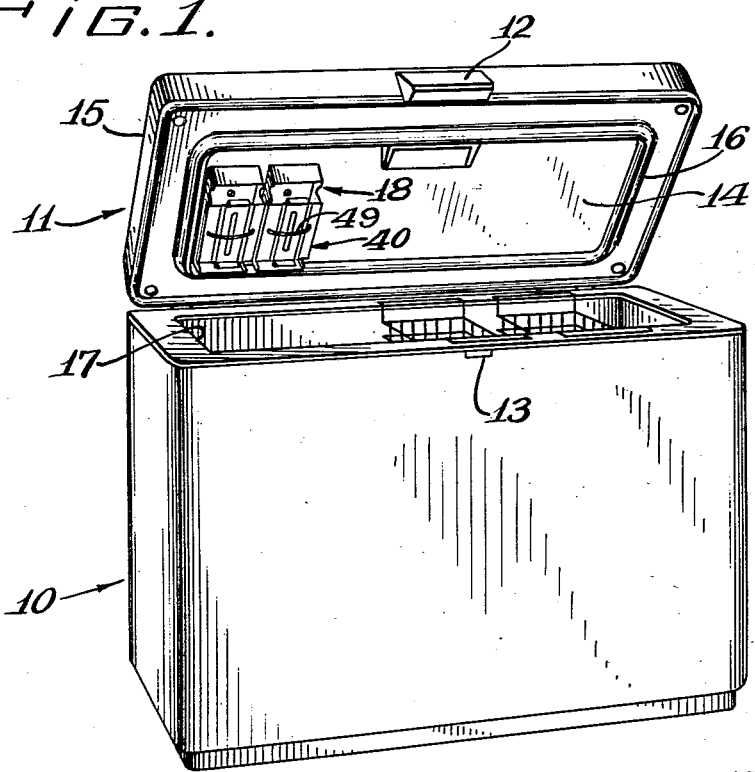
Figure 1 is a perspective view of a top-opening-type refrigerated cabinet, shown with the top partially open, in which the present invention has been incorporated.
Figure 2:
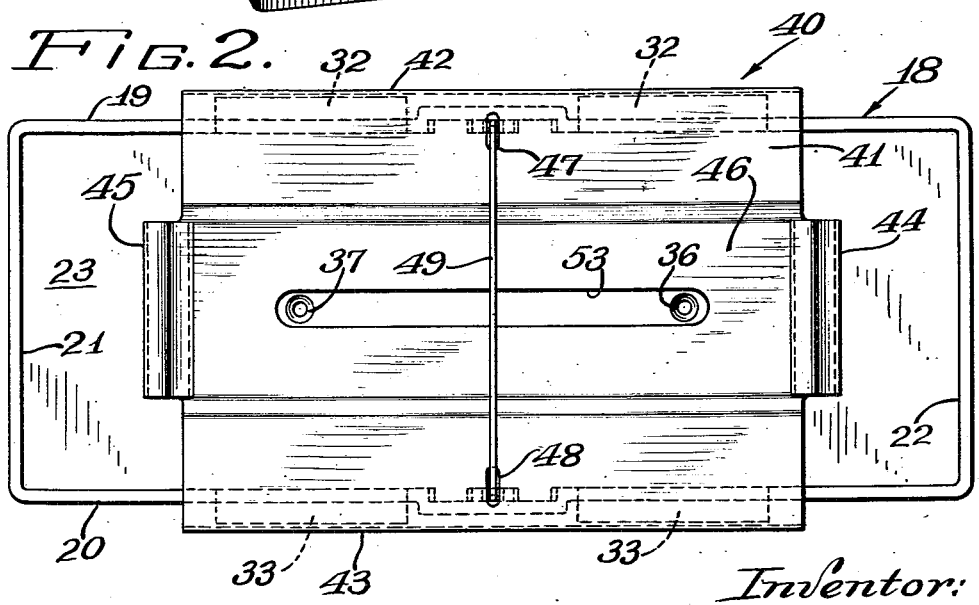
Figure 2 is a top plan view of the proposed combination storage and dispensing device as seen in an unmounted condition.

Referring now to the drawings it will be noted that a preferred application of the present invention has been illustrated by incorporating the device in a top-opening-type refrigerated cabinet, but it will be appreciated that this specific application is merely illustrative since the device may be otherwise utilized.

In the drawings a conventional freezer chest or top-opening-type refrigerated cabinet has been illustrated as including a thermally insulated wall storage cabinet portion, indicated generally by the reference character 10, and an insulated door or lid member 11 hingedly affixed thereto by any suitable spring-balanced hinging means (not shown). A combination handle and latch member 12 may be provided to engage a latching device 13 for suitably securing said lid in a closed position. The door or lid 11 is generally conventional and is fashioned with an inner pan or panel 14 of low-heat conducting material, and an outer pan or metallic shell 15 with suitable thermal insulating material disposed between said inner pan and the outer panel of said shell. Since structures of this character are so well known in the art it is felt further detailed description thereof is unnecessary. As illustrated the inner pan 14 is fashioned with a peripherally extending raised ridge or rib 16 which is disposed so as to cooperate with access opening 17, in the cabinet 10, when the lid 11 is closed and thereby may aid in sealing the interior of the cabinet against the ingress of outside air or moisture.

Now in accordance with the more specific teachings of the present invention there is provided a receptacle, indicated generally by the reference numeral 18, which may be fashioned to resemble a rectangular container having oppositely positioned upstanding side walls 19 and 20 and end walls 21 and 22, a bottom wall or floor member 23, and an open top. The lower edges 24 and 25, of the side walls 19 and 20, respectively, are longitudinally tapered or inclined and the bottom wall or floor 23 is positioned so that at one end thereof it is substantially flush with the lower edge 26, of end wall 21, while at the opposite end it is inwardly spaced from the bottom edge 27 of end wall 22. As thus disposed the floor member 23 is substantially parallel to the top edges but inclined with respect to the lower edges of said side walls for a purpose which will presently be better understood.

The side walls 19 and 20 are formed with oppositely facing inwardly opening lateral recesses 28 and 29, respectively, which are disposed substantially midway between the ends of said side walls. In each recess there is disposed a stud-like boss or abutment member 30 having a slot-like opening 31 that extends through the center thereof, which opening is continued through the portion of the floor 23 immediately there-adjacent. Each abutment 30 extends from the floor member 23 upwardly substantially less than the length of the recess, and the inner surface thereof is co-planar with the respective proximate side wall, all for reasons which will presently be understood.

On the upper edge of each of the side walls 19 and 20 there is provided a pair of spaced apart and outwardly extending flange-like shoulders or guides 32 and 33, respectively. These flange or slide rail members, preferably, are fashioned integral with the side walls of said container and are positioned one on either side, longitudinally, of each of the lateral recesses 28 and 29. Circularly-shaped recesses or cutaway portions 34 and 35 at opposite ends, respectively, of each side wall member may be provided to facilitate manual removal of articles, such as fruit juice cans or the like, from within the container.

The floor member 23, of said container, may be fashioned with spaced apart openings 36 and 37 which may, if desired, be countersunk as indicated and additionally provided with outwardly extending reinforcing abutments or bosses 38 and 39, respectively.

The container or receptacle 18 may be easily and inexpensively fashioned from any suitable well known plastic or like material that is readily formed, as by molding, into the structural form or shape illustrated. It should be understood however, that the proposed container is not limited to being fashioned from a moldable material, such as a plastic, since the invention also envisages the use of a metallic material otherwise workable for forming into said container. As illustrated the container is dimensioned to receive five conventional cans of fruit juice but, of course, its use for other purposes would govern the overall dimensions thereof.

A cover member, indicated generally by the reference character 40, is fashioned with a generally flat portion 41 having turned-over marginal edges that additionally are bent back to provide channel-like tracks or retaining guides 42 and 43, respectively, along opposite edges thereof, and said channels are dimensioned, preferably, so as to fit easily or loosely around the flanges or shoulders 32 and 33 on the container side walls. In this manner the cover is slidably positionable over the open top of said container and while being interlocked with the container is readily removable from either end thereof. Extending end portions of the cover member 41 may be turned over to provide handles 44 and 45 for operating or sliding the cover from opposite ends thereof. As illustrated the central portion of said cover member is inwardly recessed as shown at 46 and the depth of said recess may be gauged to provide adequate clearance to permit a juice can or like article to pass easily thereunder without at the same time providing such excess clearance as would encourage rattling or similar objections.

Slotted openings 47 and 48 extending inwardly from the channeled edges 42 and 43, respectively, of said cover member are positioned in alignment with the openings 31—31, of bosses 30—30, so that opposite end portions of a highly resilient bow-spring wire 49 may be inserted therethrough and the ends thereof bent over beneath the floor 23 to provide anchoring means 50 and 51 for retaining said spring in place. As thus arranged the cover 40 is manually slidable along the flanges 32 and 33 against the reactive force of the interlocked bow-spring wire member 49 and within limits controlled by said spring and upon release of the manual pressure thereon the resiliency of the spring will cause the cover to return to its original position. The cover member 41 is dimensioned longitudinally so that when the cover is in its mid-point or normal position the distance from either end thereof to the respective proximate end wall of the container is less than the diameter of any stored article, such as the juice can 52 as shown in dotted lines in Fig. 3, that may be used therewith; hence any such article or object cannot be inserted into or removed from the container without longitudinal displacement of the cover member.

A longitudinally extending slotted opening 53, in the cover member 41, provides easy access to the openings 36 and 37.

The proposed device may be mounted on a supporting surface, such as on one of the inner walls of a refrigerated cabinet, by any suitable conventional securing means such as self-tapping screws or speed clip fasteners (not shown) inserted through the openings 36 and 37 in the floor of the container; and access gained thereto for the necessary tool by way of the slotted opening 53 in said cover.

While the cover 40 is fashioned, preferably, of a metallic material and has been so depicted in the drawings herein, it will be appreciated that it is not so limited and that other materials may likewise be used without deviating from any concepts of the present invention.

When the proposed storage and dispensing device is mounted on a horizontal wall surface, the tapered or inclined side walls of the container will raise one end of the floor and thus provide a ramp-like surface thereon along which cylindrical cans may roll toward the lower end as each successive can is removed. If the device is mounted vertically, the cans will always fall or roll toward the lower end where they will be held in place by the cover member, and, since the cover is slidable both ways, additional cans or like objects may be inserted in the top or upper end without disturbing those already in place. Furthermore, when the device is invertedly mounted, as shown in the illustrative embodiment depicted herein, on the inner door pan of a top-opening-type of cabinet, the articles cannot fall out of the dispenser because the cover member is slidably interconnected to the container by the side wall flanges while the cover which additionally is resiliently interlocked with the container is thereby constrained against slidable movement by the constraining action of the bow-spring wire 49.

From the foregoing it will be appreciated that the present invention provides a simple, inexpensive yet highly useful improved storage and dispensing device that may be readily used with conventional refrigerated cabinets for making fruit juice cans or like articles easily accessible to the user of the cabinet.

Although only a preferred form of the invention has been illustrated, and that form described in detail, it will be apparent to those skilled in the art that various modifications may be made therein without departing from the spirit of the invention or from the scope of the appended claims.

What is claimed is:

1. A combination storage and dispensing device comprising, a receptacle having one side thereof open, a cover member adapted for positioning over at least a portion of the opening of said receptacle, means slidably interconnecting said cover to said receptacle whereby said cover is slidably movable over the opening in said receptacle, resilient means normally disposed with respect to the slidable axis of said cover and including a U-shaped member having free ends positioned beneath the receptacle and a connecting loop portion overlying the cover interlocking said cover and said receptacle, and having said resilient means operatively effective for returning said cover to one position after it has been slidably displaced from that position to permit insertion or removal of an article into or out of said receptacle.

2. A combination storage and dispensing device comprising, a receptacle having one side thereof open, a cover member adapted for positioning over at least a portion of the opening of said receptacle, means slidably interconnecting said cover to said receptacle and arranged so that said cover is longitudinally slidable over the opening in said receptacle to permit the insertion or removal of an article into or out of said receptacle, resilient means interlocking said cover and said receptacle including a U-shaped resilient member fashioned with a pair of spaced-apart legs connected at one end thereof by a loop portion and having the free ends of the legs positioned beneath the receptacle with the loop position thereof overlying the cover in flexible interlocking relationship, said resilient member being disposed normal to the axis of slidable movement of said cover and distortable in the direction of movement of said cover and being further reactively operative for urging said cover to one position after it has been slidably displaced from said one position for the purpose of inserting or removing an article into or out of said receptacle.

3. A combination storage and dispensing device comprising, a receptacle having one side thereof open and adapted to contain one or more cylindrically-shaped articles, a cover member whose longitudinal dimension is less than the longitudinal dimension of the opening in the receptacle and which is adapted for positioning over the opening in said receptacle so that normally each end of said cover is spaced from a proximate end wall of the receptacle a distance less than the diameter of any article contained therewithin, means slidably interconnecting said cover to said receptacle and arranged so that said cover is longitudinally slidable over the opening in said receptacle to permit insertion or removal of an article into or out of said receptacle, flexible interlocking means associated with said cover and said receptacle, said flexible interlocking means being distortable along the longitudinal axis of movement of said cover and operatively reactive for urging said cover to a normal position intermediate the ends of said receptacle after it has been slidably displaced therefrom to permit the insertion or removal of an article into or out of said receptacle.

4. A combination storage and dispensing device comprising, a receptacle having upstanding side and end walls and a bottom wall and having the top thereof open, said receptacle having an inwardly opening recess in each side wall and an abutment member disposed in each said recess and having said receptacle further provided with outwardly extending flanges along the top marginal edge of each said side wall, a cover member having longitudinally extending channels along side marginal edges thereof adapted to overlie said marginal edge flanges of the receptacle and to slidably interconnect said cover and said receptacle so that said cover is slidable over the top opening of said receptacle to permit the insertion or removal of an article into or out of said receptacle, a resilient member normally disposed with respect to the sliding axis of said cover and distortable in the direction of movement of said cover, said resilient member including a pair of spaced-apart legs connected together at one end by a loop portion and having the free ends of said legs positioned one each in said abutment members, said cover being provided with transversely extending slotted openings adapted to receive the loop portion of said resilient member to provide a resilient interlocking connection between said cover and said receptacle that is reactively operative for urging the return of said cover to a normal position after it has been slidably displaced from said normal position for purposes of gaining access to said receptacle.

5. A combination storage and dispensing device comprising, a receptacle having one side thereof open, a cover member adapted for positioning over at least a portion of the opening in said receptacle, slide means connecting said cover to said receptacle so that said cover is slidable longitudinally over the opening in said receptacle to permit the insertion and removal of articles into and out of said receptacle proximate either end thereof, resilient means additionally interconnecting said cover and said receptacle and operative for maintaining said cover normally in a centered position with respect to the ends of said receptacle, and having said resilient means sufficiently yieldable in a direction normal to the plane of the end walls of said receptacle to permit said cover to be slidably displaced from said centered position a distance sufficient to introduce an article into or remove an article from said receptacle.

6. A combination storage and dispensing device comprising, a receptacle having upstanding side and end walls and a longitudinally inclined bottom wall and having the top side thereof open and being adapted to contain one or more cylindrically shaped articles therewithin, a cover member whose longitudinal dimension is less than the longitudinal dimension of the opening in the receptacle and which is positioned over at least a portion of the open top side of said receptacle and disposed so that the ends thereof are spaced from respective proximate end walls of the receptacle, means slidably interconnecting said cover to said receptacle and arranged so that said cover is slidable over the opening in said receptacle to permit the insertion or removal of an article into or out of said receptacle, resilient means attached to said receptacle and loosely interlocked with said cover, said resilient means being distortable to yield in the direction of movement of said cover and being additionally reactively operative for normally urging said cover into a position such that each end thereof is spaced from a respective proximate end wall of the receptacle a distance less than the diameter of any article contained within said receptacle.

References Cited in the file of this patent

UNITED STATES PATENTS

| 348,164 | Judson | Aug. 24, 1886 |
| 1,313,003 | Mecklemburg | Aug. 12, 1919 |
| 1,923,033 | Frick | Aug. 15, 1933 |
| 2,313,428 | Glenn | Mar. 9, 1943 |
| 2,506,600 | Kassovic | May 9, 1950 |
| 2,534,815 | Fields | Dec. 19, 1950 |
| 2,582,821 | Duell et al. | Jan. 15, 1952 |

FOREIGN PATENTS

| 592,717 | Great Britain | Sept. 26, 1947 |